United States Patent [19]

Gravely

[11] 4,098,265
[45] Jul. 4, 1978

[54] SOLAR ENERGY COLLECTOR

[76] Inventor: Ben T. Gravely, 7001 Buckhead Dr., Raleigh, N.C. 27609

[21] Appl. No.: 684,758

[22] Filed: May 10, 1976

[51] Int. Cl.$^2$ .............................................. F24J 3/02
[52] U.S. Cl. .................................................. 126/271
[58] Field of Search ................................ 126/270, 271

[56] References Cited
U.S. PATENT DOCUMENTS

| | | | |
|---|---|---|---|
| 1,250,260 | 12/1917 | Wilcox | 126/271 |
| 2,202,756 | 5/1940 | Cline | 126/271 |
| 2,311,579 | 2/1943 | Scott | 126/271 |
| 2,705,948 | 4/1955 | Rostock | 126/271 |
| 2,783,682 | 3/1957 | Swenson | 126/271 |
| 3,250,269 | 5/1966 | Sherock | 126/271 |
| 3,314,415 | 4/1967 | Rowekamp | 126/271 |
| 3,886,998 | 6/1975 | Rowekamp | 126/271 |
| 3,898,979 | 8/1975 | Medico, Jr. | 126/271 |
| 3,939,819 | 2/1976 | Minardi | 126/271 |
| 3,943,911 | 3/1976 | Yu | 126/271 |
| 4,003,367 | 1/1977 | Wikholm | 126/271 |

Primary Examiner—Lloyd L. King

[57] ABSTRACT

A light weight, high efficiency solar energy collector which utilizes a shallow, open-topped, foamed, integrally skinned or otherwise sealed plastic vessel with a multiple layer, light transmissive cover is described. The cover is sealed to the inner edges of the continuous rim of the vessel to contain a liquid energy absorbing material which is circulated in the vessel in contact with the lower surface of the innermost cover layer. An optically opaque, preferably black, liquid is utilized as the absorbing material which is circulated in direct optical and physical contact with the cover and then to a heat exchanger immersed in a heat storage medium to release its collected energy for later use.

4 Claims, 4 Drawing Figures

SOLAR ENERGY COLLECTOR

FIELD OF THE INVENTION

This invention relates to solar energy collectors and absorbers in general and to relatively low temperature (below 150° C) and high efficiency, light weight collector structures and methods in particular.

PRIOR ART

Many prior solar energy collectors and methods have been developed over the course of years, and commerical attempts at useful and efficient solar energy collection devices have met with some success since at least 1870 in the U.S., and perhaps much earlier in man's history worldwide. The general goal of all such devices and development has been to take advantage of the freely available energy of the sun.

Most of the prior art devices of this type have utilized relatively flat, transparent-topped enclosures to capture the sun's rays by methods well-known in the art. Many of these use the unfocused light of the sun to heat an exchange/collection coil, plate or sheet of generally dark-surfaced metal which is in contact with a secondary heat exchange medium. In these devices, a good deal of the energy absorbed is lost due to reradiation out from the collector enclosure. Energy is also lost by conduction inefficiencies through the metal or other primary heat exchange device to the secondary heat collection medium, usually water. Devices such as these are more difficult and costly to fabricate, due to the use of metal, glass and similarly expensive physical components, and they suffer generally from a host of sealing problems, plumbing difficulties and expansion/contraction stress problems, corrosion difficulties, especially in water and aluminum systems, and intermetallic corrosion between aluminum and copper, than is to be desired.

Some prior art devices have resorted to the use of multiple pane transparent covers to reduce heat losses from the collector enclosure and some have added insulated walls and bottoms as well, but at added cost and complexity of construction, to further improve the collection efficiency of the devices. In these devices, however, the general problems of light reflection from the transparent cover/or covers still remains to reduce collection efficiency. The absorption of radiant energy by the black-surfaced primary collection container or conduit also remains as an impediment to higher efficiencies, and the problems of maintaining the black, generally painted, surfaces compound these difficulties. Often, and as frequently as every few years, the black surfaces must be renewed, at some considerable expense, in these devices. Also, the problems and energy losses which are inherent in transferring heat, usually by conduction or convection, or both from the primary absorber or container into a secondary collection and conveying fluid still remain in such devices. Of course, the difficulty of assembling and of maintaining the physical integrity of such devices increases with increasing complexity. Also, the addition of and quality of added insulators or similar measures only compound the cost and difficulty of making and employing these devices.

More recent developments such as U.S. Pat. Nos. 3,866,285 and 3,918,430 illustrate a trend towards simplifying the design and construction of collectors by using easily fabricated, low-cost foamed plastic container structures; however, the difficulties of adding the seemingly necessary fluid conduits of a black-surfaced primary absorber still remain, even though the costs and other problems heretofore mentioned have been reduced or partially eliminated.

It remains, however, to develop a less expensive, more highly efficient and more easily constructed and employed solar energy collector of the type described, and to maximize heat transferred at the collector while eliminating, insofar as possible, the costly, difficult to fabricate, bulky, heavy and expensive metal components, and to incorporate high quality insulation and low cost materials, all in one design.

OBJECTS OF INVENTION

In light of the foregoing and other problems and shortcomings of the prior art, it is an object of the present invention to provide an improved solar collector structure which has higher collection efficiency.

It is a further object of the invention to provide an improved structure for a solar collector which is simpler, less costly and easier to construct and employ than the prior devices.

It is still a further object to provide an improved solar collector which eliminates or reduces the use of costly metals and other difficult to fabricate materials while incorporating a high degree of insulation capability to conserve collected energy.

SUMMARY OF INVENTION

The foregoing and still additional objects of the invention are met herein by utilizing a relatively shallow, open-topped, preferably integrally-skinned, foamed plastic insulation and support structure for the main body of the collector. A raised continuous rim having a vertically recessed flat horizontal ledge on the inner edge thereof is formed integrally with the main body to create a basic shell or vessel. Then two or more light-transmissive, preferably transparent, covers, which are spaced apart, are put over the open top of the main body and sealed to the inner ledge and/or adjacent surface of the rim of the body to create a fluid impervious collector vessel. The use of self-skinned foamed plastic for the main body effectively creates an overall fluid impervious container having high insulation value, low cost and weight, and of an easily constructed and employed nature as well. A primary collection fluid, preferably a black or optically absorbent liquid, is circulated in the collector in direct optical and physical contact with the lower surface of the cover, thus maximizing absorption of light and minimizing reflection losses and eliminating entirely the conduction and, since this liquid serves as the reservoir liquid as well, the convection losses inherent in tube-type fluid absorber and convection storage systems where the fluid is not in direct communication with the impinging energy.

DETAILED SPECIFICATION

A preferred form of the invention will now be described with reference to the drawings of a preferred embodiment, but it will be understood by those of skill in the art that many variations or departures from the basic form illustrated may be made while still preserving the spirit and method of the invention; therefore it is not intended that the invention be limited to the details and techniques described, so long as the basic essence of the invention be preserved.

Figure 1:
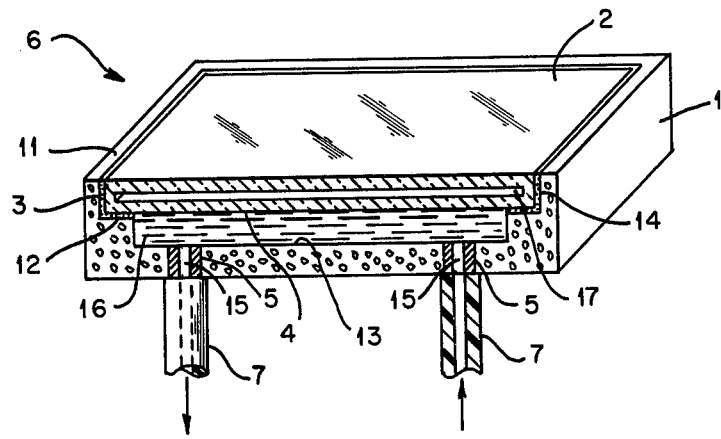
FIG. 1 illustrates, in a transverse sectional, partially pictorial view, the main details of construction and mode of operation of a preferred embodiment of the invention.

Turning, then, to FIG. 1, a preferred embodiment of the solar collector of the invention is shown in cross-section. In FIG. 1, the main body of the collector vessel 1 is shown as comprising an integrally-skinned, foamed plastic tray having a continuous raised rim or wall, 11, Although not all of the vessel is shown, it will be easily understood that it is a vessel having a continuous floor 13 surrounded by a integrally formed raised wall 11 of the same material, thus forming an open-topped tray or pan.

The wall or rim 11 has a recessed, continuous inner ledge or lip formed as a flat, depressed edge surface 12 running entirely around the inner periphery of wall 11 as shown in FIG. 1. This ledge or lip 12, together with the adjoining surface 14 of wall 11, forms a complete step or ledge against which the cover 2 may be appropriately located and sealed.

The cover 2 is preferably of glass or transparent plastic having sufficient strength and rigidity to be self-supporting when it is placed on ledge 12.

The preferred form for cover 2 is, as shown, of doublewall or thickness with the individual sheets or panes separated by a space. The space between the cover sheets 2 may be evacuated or filled to low pressure with a dry gas 17 as is generally well-known in the art of insulated glass panes for construction use. The cover 2 is preferably one of the many commerically available double pane insulating glass panels but, as will be easily appreciated, separate sheets of ordinary window glass separated by a suitable space may be employed instead. Alternatively, clear transparent plastic sheets may be used. However, it is generally required that the cover 2 have sufficient strength to be self-supporting across the open expanse of the top of the vessel 1. If necessary, internal supporting projections up from the bottom 13 of the vessel could be formed to help support the cover 2 against inward and outward pressure over wide expanses, as can be easily understood; but in the preferred embodiment this was not necessary since the commercially available insulated glass is self-supporting over expanses up to 3 feet and hence no internal supports are shown projecting up from the bottom 13 to contact the cover 2. Overall, it is preferred that relatively shallow vessels, having top openings about three times or more the depth of the vessel, be used as little is gained from having the excess weight and volume of deeper absorbant layers or pools.

The edges of cover 2 are sealed against ledge 12 in the preferred embodiment using an adhesive sealant 3 as is generally practiced in the industry. Suitable adhesives to bond the cover 2 to ledge 12 and wall surface 14, if desired, must create a liquid-tight and impervious flexible seal. The choice of adhesive or sealant depends, to a large degree, upon the foam plastic composition used, as will be described, to construct the body of vessel 1, and on the glass or plastic composition of the cover 2. It is also necessary to accommodate in the seal adhesive 3 for the difference, if any, in thermal expansion coefficients for the cover 2 and the body 1. If the cover 2 and body 1 have similar coefficients of thermal expansion, however, then a rigid bonding epoxy or solvent welding adhesive or a host of other similar joining techniques commonly utilized in the plastics and liquid container industries may be employed to good effect. But if the cover 2 and the body 1 differ substantially in their respective coefficients of thermal expansion, then a flexible adhesive, as alluded to earlier, must be used. Suitable compositions for the adhesive seal 3 under such circumstances are the family of silicone elastomers widely available and in use for such purposes are employed as in the preferred embodiment. For example, GE's RTV 103 or 108 material, with its primer may be used. Adhesion to plastic materials may, as is well-known, be greatly enhanced if the surfaces to be joined are roughened or if an etchant or specified primer is first applied to the surfaces before the application of adhesive 3.

Figure 1A:
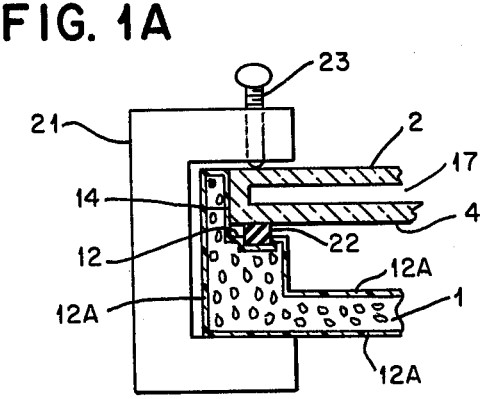
FIG. 1A illustrates an alternate form of sealing means for sealing the cover to the inner recessed lip or ledge of the rim of the main vessel body.
Figure 1B:
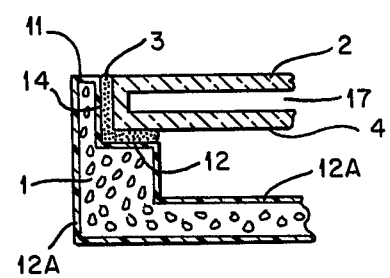
FIG. 1B illustrates a preferred means of sealing the cover to the inner recessed lip or ledge of the rim of the main vessel body.

FIG. 1B illustrates an enlarged section of the area where the preferred embodiment's double-paned insulating glass cover 2 joins the lip or ledge 12 and inner surface 14 of wall 11. Here the self-skinning foam can be seen to advantage where the inner and outer surfaces are shown as having a dense, uniform skin 12A. The space 17 between the separate cover sheets forming cover 2 is also clearly shown, and it is preferred that this space be at least ¼ inch, or more, to reduce, or substantially eliminate, convection between the sheets of glass, or plastic 2. The separate sheets of glass or plastic 2, as the case may be, are joined together at their entire peripheral edges by a short wall or spacer, in the case illustrated, of the same material, and are provided in this form by many commerical concerns. Other types of separators to keep the sheets of cover 2 are also in general use, but are not shown here as they are well within the comprehension of those of skill in the art.

Referring to FIG. 1B, adhesive 3 for sealing the preferred glass cover 2 to the preferred foamed plastic body 1 is silicone elastomer. Several commerically available and well-known adhesive sealers of this type such as the General Electric Company's type 103 or 108 RTV materials have been successfully employed, but other sealers may be used with good effect.

FIG. 1A illustrates an alternative mechanical means of sealing cover 2 to body 1. As shown schematically in FIG. 1A, a clamp 21 having screw pressure means 23 can effectively be employed to compress a rubber sealing ring 22 against ledge 12 to form a tight seal between cover 2 and body 1. The sealing ring 22 is shown as being a square sectional rubber or similar compressible material strip, but it will be understood that it must be a continuous piece and can also be of circular or other suitable section. Also, as is shown in FIG. 1A, the ring 22 may be seated in a groove or recess in ledge 12, although this is generally more necessary for circular cross section ring seal rubbers than for flat or square sectioned ones such as is illustrated. Also, it is preferred that there be at least one screw 23 for each several inches of length of seal to be compressed, although only a single screw 23 is shown for purposes of illustration and it is generally desirable that the screw 23 be disposed generally in vertical alignment with the sealing ring 22. Other clamp pressure means such as a continuous C-shaped gripping spring of steel are also contemplated.

Also shown in FIGS. 1A and 1B is the skin 12A, self-formed on main body 1 when the foamed plastic material is placed in a mold and allowed to expand. The process, and the resulting liquid impervious skin 12A which result, is well-known in the plastics industry and many suitable such foam plastic formulations are commerically available. However, injection moldable self-blowing foaming compositions of thermoplastics such as polypropylene are often used as are thermosetting chemically gas blown compositions of polyurethane or similarly wellknown and widely used resins. Most of these compositions form, at the surface of the mold, a thin skin or layer of parent material which has relatively few voids and thus presents a liquid impervious wall to the outside. This is utilized to good effect in the preferred embodiment of the invention since it eliminates a separate sealing step in constructing the collector, but open-celled or closed, non-skinning foam compositions may also be employed, provided that an impervious liquid resin or similar film is applied to seal the inner surfaces of vessel 1 when so constructed.

It is not intended that a particular foaming plastic composition be used to limit the construction of the preferred embodiment because of the very wide variety of acceptable material compositions and processes available. It is preferred, however, that the composition chosen have a sufficient strength and density to be self-supporting and rigid enough to be structurally sound under the loads anticipated in use. Foams of polyurethane, of rigid composition, or polypropylene, either of which may be on the order of 1 to 20 lbs. per cubic foot, are suitable. Such densities have already been recognized as sufficient for strength in foamed plastic solar collectors such as shown by U.s. Pat. No. 3,866,285 noted previously.

The overall collector assembly 6 is indicated in FIG. 1 as having inlet and outlet apertures 5, which may be screwthreaded as shown, or smooth if desired. Inlet and outlet supply pipes 7 having a suitable bore 15 are shown as attached via screw threads to the openings 5. It will be instantly appreciated that suitable inserts in the plastic body may have molded or cut screw threads, etc. instead of forming threads in the body 1, however in either case the threads should be tapered as is generally well-known in the plumbing and piping arts for best performance. Smooth surface unions cemented or adhesively bonded are also contemplated.

From FIG. 1, it will be understood that the assembled apparatus is exceptionally simple to construct. The foamed plastic body 1 may be made all in one piece at one time and with its integral, water-tight, or impervious skin as noted earlier. Then a one-piece double walled cover may be bonded to the formed ledge of the main body and appropriate openings can be made in the body to admit entry and exit of the fluid primary energy absorber. The foamed plastic body exhibits good strength and excellent thermal insulation characteristics as is well-known, and no channels, tubes or similar conduits for the primary absorber are needed. Instead, the primary liquid energy absorber is directly, optically and physically exposed to incident solar energy passing through the transparent cover 2, and no intermediate material is involved.

The double pane glass cover insulates well so that the heated liquid absorber is not cooled by conduction or convection to any great degree, but more importantly, it will be noted that the liquid 16 generally completely fills the vessel 1. Liquid 16 actually touches the lower surface 4 of cover 2, as shown in FIG. 1, in order to create a continuous optical path for light energy passing through the cover 2.

As is well-known from physics, there exists, at an interface between different density light transmissive materials, an amount of reflection which can be greatly reduced if the different refractive indices of the two materials can be closely matched or, failing this, if the materials can be brought into direct contact, thus eliminating any air space between them so that only a single change in index of refraction is encountered by a light beam traversing the interface.

By holding liquid 16 in contact with the inner surface 4 of glass cover 2, the surface-to-air-to-surface interface, as exists in most prior art designs, is eliminated and an optical continuum of glass and liquid replaces it, which thereby greatly reduces energy lost through reflection at the boundaries between the two materials. Also, since the primary absorbing liquid and the circulating liquid are one and the same, no heat transfer to a secondary medium, or from some preliminary medium such as black metal, is required at the collector and this also greatly reduces energy losses. Significantly, there is no "black surface" to be maintained.

Preferably the liquid 16 is itself made more efficient in its task as primary absorber by coloring it optically opaque, preferably black. As was recognized early in the art, a black liquid such as in U.S. Pat. Nos. 2,133,649, 2,960,482 or 2,989,751 is much more efficient at collecting than a clear or other colored liquid which is directly exposed to the solar energy. However, none of these prior patents exhibited wetting or contact of the cover by the liquid and/or with the overall improved structure of the present invention which facilitates contact between the glass cover and the liquid by providing a sealed, impervious container.

The black liquid 16, which is preferred, may suitably be made by suspending ordinary carbon or lampblack in water to form ink. Antibacterial agents, antifreezing compounds, algaecides and fungicides may also be added, and some detergent or other surface-tension reliever or wetting agent can also be usefully employed to enhance the properties of the liquid.

Figure 2:
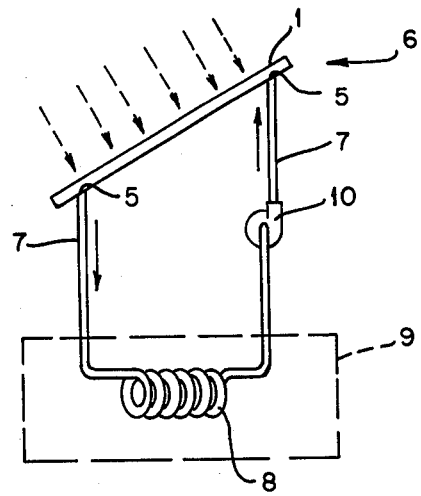
FIG. 2 illustrates schematically the mode of employment of the apparatus in FIG. 1 in an operative solar energy collection system.

Turningnow to FIG. 2, the overall form of a solar energy collection system is schematically illustrated. Details are not indulged here since many suitable and well-known systems may be employed to equally good use. However, the system comprises collector 6 in which collector body 1 is oriented at an angle to receive the sun's rays, generally indicated by the dashed arrows directed at the top surface of collector 6 which will be understood to be transparent cover 2.

In collector 6, the black liquid 16 (not shown) enters and exits via pipes 7 through apertures 5 as previously described. A heat exchanger 8 immersed in a suitable tank 9 of any desired size and containing any desired storage medium is also connected in series with collector 6 via pipes 7. However, it should be clearly understood that, without exchanger 8, the liquid 16 in tank 9 could be circulated by itself. The liquid absorber is caused to circulate by pump 10 and to be under sufficient pressure to completely fill vessel 1 and wet or contact substantially the entire undersurface of cover glass 2 as explained earlier. Of course, more than one pump 10 might be used and multiple collectors 6 would normally be employed for the purpose of, for example, collecting enough energy to heat a dwelling house. Using the pump 10 in a sucking mode instead of pushing mode would tend to draw the cover 2 inward, thus helping to prevent leaks, but two pumps could be used, one at the inlet and one at the outlet of collector 6, to reduce the pressure on the cover to nothing, or virtually so.

ADVANTAGES

As will now be easily apparent, certain advantages are inherent in this improved design and construction, as well as in the method employed, which render the solar energy collector more efficient and less costly than other approaches already taken in the prior art.

Chief among these advantages, other than extreme simplicity of construction and low cost, themselves admirable benefits, is the improved thermal capture efficiency of the collector described. Efficiencies as high as 87%, or approximately so, have been observed and it is believed that even higher capture efficiencies are possible with this design.

Secondly, the collector may actually serve as a building construction panel, for a roof or the like, supported by rafters, etc. or by light plywood and rafters in combination, thus eliminating or reducing to a great degree the cost of overall dwelling and collector system construction. Its light weight, due to light materials and shallowness, is also an advantage.

The foregoing and still other unnamed advantages being inherent in this design, it is desired to secure the protection of letters patent for the following invention as described in the claims.

What is claimed is:

1. Solar energy collection apparatus, comprising:
   a. an impervious surfaced, foamed plastic, thermally insulating, open-topped relatively shallow liquid container body having an integrally formed continuous, recessed inner ledge sealing surface;
   b. said liquid container body having at least one inlet and one outlet aperture for admitting and removing liquid to and from the interior of said body;
   c. a cover means for covering said open top of said container body, said cover comprising at least two parallel layers of light transmissive material, said layers being separated from one another by at least one quarter inch of open space, the lower layer of said cover being continuously sealed to said recessed inner ledge sealing surface of said rim in a liquid-impervious fashion;
   d. said cover and said container body forming an overall liquid-impervious, thermally insulated liquid container vessel; and
   e. means for sealing said cover to said inner ledge sealing surface to retain liquid within said vessel in contact with the interior surfaces thereof.

2. Apparatus as described in claim 1, further comprising:
   a liquid energy absorbant material, said material completely filling the said vessel and continuously contacting the inner surface of said cover; and
   means for continuously circulating said liquid from a reservoir to said vessel and back to a reservoir.

3. Apparatus as described in claim 2, wherein:
   said liquid energy absorbant material is optically opaque.

4. A method of collecting solar energy comprising the steps of:
   exposing an optically opaque liquid energy absorbing medium to the direct rays of the sun; and
   confining said liquid in a continuous, relatively shallow, broad volumetric expanse during said exposing step within a thermally insulative vessel having a top opening having a dimension at least three times the depth of said vessel, said vessel being closed by at least one light transmissive, thermally insulative face of a dimension at least equivalent to said top opening;
   contacting the inner surface of said light transmissive face continuously during said exposing step with said relatively shallow volume of liquid energy absorbent medium; and
   circulating said liquid into and of said vessel continuously to collect, thereby, the solar energy contained in said direct rays of sunlight impinging upon said relatively broad and shallow volume of said liquid.

* * * * *